No. 874,859. PATENTED DEC. 24, 1907.
W. W. NEIGHBOUR.
ANTIFRICTION DEVICE FOR CRANKS AND PITMEN.
APPLICATION FILED FEB. 14, 1907.
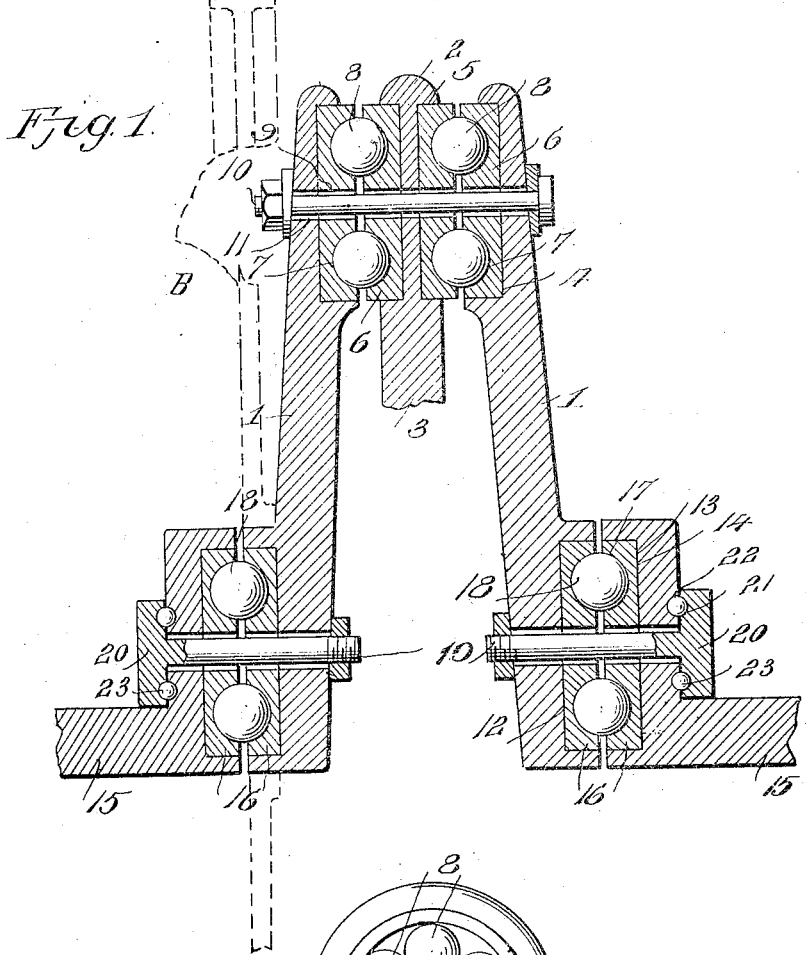
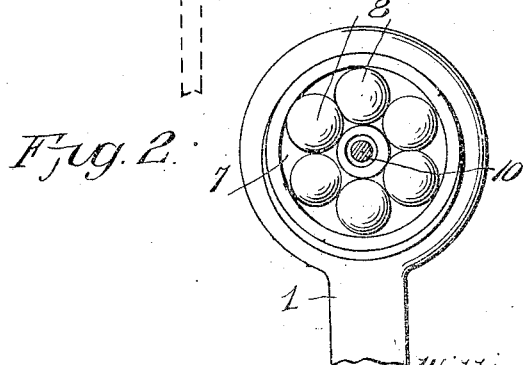
Inventor
William W. Neighbour,
Witnesses
Frank Hough
Wm. Bagger
By Victor J. Evans
Attorney

UNITED STATES PATENT OFFICE.

WILLIAM W. NEIGHBOUR, OF DENISON, TEXAS.

ANTIFRICTION DEVICE FOR CRANKS AND PITMEN.

No. 874,859.    Specification of Letters Patent.    Patented Dec. 24, 1907.

Application filed February 14, 1907. Serial No. 357,278.

*To all whom it may concern:*

Be it known that I, WILLIAM WEBSTER NEIGHBOUR, a citizen of the United States of America, residing at Denison, in the county of Grayson and State of Texas, have invented new and useful Improvements in Antifriction Devices for Cranks and Pitmen, of which the following is a specification.

This invention relates to cranks and pitmen for various kinds of machinery; and it has for its object to provide an anti-friction device for the same which shall possess superior advantages from point of simplicity, durability and general efficiency; by the use of which oil and other lubricants may be dispensed with; and which shall be so constructed as to prevent dust and grit from accumulating in the anti-friction bearings.

With these and other ends in view which will readily appear as the nature of the invention is better understood, the same consists in the improved construction and novel arrangement and combination of parts which will be hereinafter fully described and particularly pointed out in the claims.

In the drawings,—Figure 1 is a sectional view taken through a crank and through the portion of a pitman connected therewith, the same being equipped with anti-friction bearings constructed in accordance with the principles of the invention. Fig. 2 is a detail elevation of a portion of the crank showing the anti-friction devices.

Corresponding parts in both figures are denoted by like characters of reference.

The crank arms 1, 1 and the head 2 of the pitman 3 are provided in their opposing faces with circular recesses or sockets 4 and 5 wherein are fitted circular disks or cups 6, the opposing faces of which are provided with annular grooves or ball races 7 for the reception of anti-friction balls 8. The grooves or ball races 7 are of such dimensions that when the balls 8 are in position, the disks or cups 6 will be spaced apart sufficiently to permit dust, grit, and other obstructions that may enter the bearings to work out freely.

The disks or cups 6 are provided with the central apertures 9 for the passage of a bolt or connecting member 10 which also extends through corresponding apertures 11 in the crank arms 1 and the pitman 2, respectively. It will be observed that this bolt or connecting member serves only to connect the parts; it does not in any sense constitute a pivot for the pitman; the pivot upon which the pitman turns being formed by the anti-friction balls.

The inner ends of the crank-arms 1, 1 are provided with recesses 12 facing corresponding recesses 13 in the lugs 14 of the supporting block 15; the recesses 12 and 13 accommodate the disks or cups 16 which, like the disks 6, are provided with annular grooves or ball races 17 for the anti-friction balls, here designated 18. The inner ends of the crank arms are connected with the lugs 14 by tie-bolts 19, the heads of which, 20, are provided with ball races 21 facing corresponding grooves or ball races 22 in the exterior surfaces of the lugs 14 for the reception of small anti-friction balls 23 which are needed in order to permit the bolts 19 to rotate with the crank arms or members 1.

The operation and advantages of this invention will be readily understood from the foregoing description taken in connection with the drawings hereto annexed. A rotary member such as a band wheel or pulley B to which motion is to be transmitted by the pitman or from which motion is to be transmitted through the pitman, is to be connected with the crank for rotation therewith, as indicated in dotted lines in Fig. 1 of the drawings. It is evident that when the pitman is operated to rotate the crank, the wheel or member B will rotate therewith; on the other hand, assuming that the wheel or member B is driven from any source of power, the crank and pitman will serve to transmit motion in the usual well known manner to a reciprocatory member or body.

The construction is simple and inexpensive, and the anti-friction members, constructed and arranged as herein described, are thoroughly efficient for the purpose for which they are provided.

What is claimed is:—

1. In a device of the class described, the crank arms and the pitman head provided with circular recesses in their opposing faces, circular disks or cups fitted in said recesses and having annular grooves or ball races in their opposing faces, anti-friction balls fitted in said grooves and spacing the disks or cups apart, and a connecting member extending through the crank arms and the pitman head, and axially through the disks or cups.

2. In a device of the class described, a pair of crank arms having circular recesses, bearing members opposed to said crank arms and having corresponding circular recesses, disks or cups fitted in said circular recesses and having annular grooves in the faces thereof, anti-friction members fitted in said grooves and spacing the disks apart, headed connecting members extending axially through the disks, and anti-friction balls interposed between the heads and the connecting members and the adjacent surfaces.

In testimony whereof, I affix my signature in presence of two witnesses.

WILLIAM W. NEIGHBOUR.

Witnesses:
SOLON S. DURLAND,
WILLIAM G. NESS.